No. 749,392. PATENTED JAN. 12, 1904.
G. A. LUTZ.
ELBOW FOR CONDUITS FOR ELECTRIC WIRES.
APPLICATION FILED MAY 7, 1901. RENEWED JUNE 5, 1903.
NO MODEL.
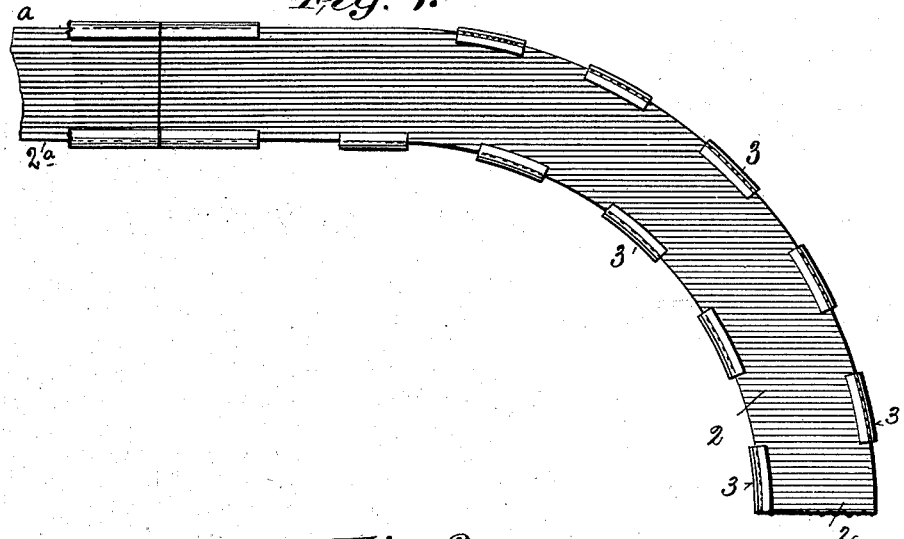
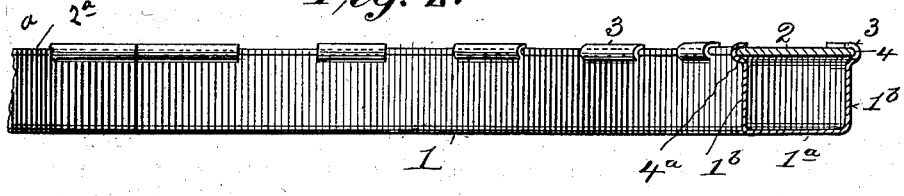

No. 749,392. Patented January 12, 1904.

UNITED STATES PATENT OFFICE.

GEORGE A. LUTZ, OF NEW YORK, N. Y., ASSIGNOR, BY MESNE ASSIGN-MENTS, OF ONE-HALF TO FRANK K. BOLAND, OF NEW YORK, N. Y.

ELBOW FOR CONDUITS FOR ELECTRIC WIRES.

SPECIFICATION forming part of Letters Patent No. 749,392, dated January 12, 1904.

Application filed May 7, 1901. Renewed June 5, 1903. Serial No. 160,261. (No model.)

*To all whom it may concern:*

Be it known that I, GEORGE A. LUTZ, a citizen of the United States, and a resident of New York city, borough of Brooklyn, State of New York, have invented certain new and useful Improvements in Elbows for Conduits for Electric Wires, of which the following is a specification.

My invention relates to means for enabling wires in conduits to be carried around corners; and the invention has special reference to elbows to be used in conjunction with conduits having channels for receiving the wires, upon which conduits covers are provided to inclose the wires, my invention being adapted for use in conjunction with conduits of the class shown in United States Letters Patent No. 667,567, issued to Emmett D. Page, dated February 5, 1901.

In carrying out my invention I provide an elbow in curved form having one or more channels or ducts to receive electric wires and provided with a cover composed of a sheet of metal adapted to fit upon the elbow and having a form corresponding to the curve of the elbow, and means are provided for holding the covers in position upon the elbow and for readily permitting the cover to be applied and removed.

The invention also consists in the novel details of improvement, that will be more fully hereinafter set forth and then pointed out in the claim.

Reference is to be had to the accompanying drawings, forming part hereof, wherein—

Figure 1 is a plan view of an elbow embodying my invention, and Fig. 2 is an edge view thereof.

In the accompanying drawings similar characters of reference indicate corresponding parts in both views.

The numeral 1 indicates the elbow, which is shown in curved form and composed of a bottom $1^a$ and sides $1^b$, forming a channel to receive wires, and 2 is the cover for the same. The elbow may be made of sheet metal rolled or bent to the desired shape, and the cover 2 is preferably of relatively thin metal adapted to overlie the same, having the same general shape. The means I have shown for holding the cover upon the conduit consists of lugs or projections 3, formed on the upper edges of the sides $1^b$ of the elbow at distances apart and adapted to be folded over the cover. The projections or lugs 3 are adapted to be bent in such form as to provide grooves 4, having webs $4^a$ lying under the cover 2, whereby the latter is supported, and the folded-over portions of the projections or lugs maintain the cover upon the elbow. (See Fig. 2.) To apply the cover, the projections or lugs 3, at least on one side, are straightened out sufficiently to enable the cover to pass them, and then the latter is laid upon the elbow, so as to rest upon the underlying webs $4^a$, and then the lugs are bent down upon the cover in the positions indicated in the drawings. The elbow will be connected in line with conduits $a$, and the shape of the conduits should substantially correspond to the cross-section of the elbow, so that they may be alined. When it is desired to reach the wires within the elbow, it is merely necessary to bend the projections or lugs 3 outwardly and then lift the cover from the elbow to expose the contained wires. As the elbow is preferably made of thin sheet metal, it will be cut to the shape of the elbow, so as to fit properly therein. It will thus be seen that the elbow shown forms a continuation of the conduit $a$, with which it alines, so that the wires can be run continuously from one conduit to another around a corner at which the elbow is located.

If it is desired to connect the ends of the elbow and the adjacent ends of the conduits, any suitable means may be provided; but preferably a bond will be used for forming electrical circuit between the elbow and the conduits.

Having now described my invention, what I claim is—

An elbow for conduits having a channel and provided with projections at distances apart along the upper edges of its sides, in the form of grooves, and a cover corresponding substantially to the contour of the elbow having its edges received in said grooves, the metal of the elbow being bent over upon the cover, substantially as described.

GEO. A. LUTZ.

Witnesses:
M. MANNING,
T. F. BOURNE.